(12) United States Patent
Inoue

(10) Patent No.: US 6,947,207 B2
(45) Date of Patent: Sep. 20, 2005

(54) RAMAN AMPLIFIER, OPTICAL TRANSMISSION SYSTEM USING SUCH AMPLIFIER AND PUMPING LIGHT SOURCE THEREFOR

(75) Inventor: Masayuki Inoue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 282 days.

(21) Appl. No.: 10/359,200

(22) Filed: Feb. 6, 2003

(65) Prior Publication Data

US 2003/0169480 A1 Sep. 11, 2003

(30) Foreign Application Priority Data

Mar. 6, 2002 (JP) ........................................ 2002-060884

(51) Int. Cl.[7] .............................................. H04B 10/12
(52) U.S. Cl. .................................... 359/334; 359/341.3
(58) Field of Search ............................. 359/334, 341.3, 359/343

(56) References Cited

U.S. PATENT DOCUMENTS

| | | | |
|---|---|---|---|
| 6,366,729 B1 * | 4/2002 | Brandon et al. ............ | 385/123 |
| 6,433,922 B1 * | 8/2002 | Ghera et al. ................. | 359/334 |
| 6,466,362 B1 * | 10/2002 | Friedrich .................... | 359/334 |
| 6,519,082 B2 * | 2/2003 | Ghera et al. ............. | 359/341.4 |
| 6,771,864 B2 * | 8/2004 | Kubo et al. ................. | 385/123 |

FOREIGN PATENT DOCUMENTS

JP 2001-51309 2/2001

OTHER PUBLICATIONS

M. Nissov, et al. "Rayleigh Crosstalk in Long Cascades of Distributed Unsaturated Raman Amplifiers" *Electronics Letters* vol. 35 No. 12 (Jun. 10, 1999) pp. 997–998.

J. Bromage, et al. Optical Fiber Communication Conference and Exhibit (OFC2002) Technical Digest (Mar. 17–22, 2002) pp. 119–120.

* cited by examiner

*Primary Examiner*—Bernarr E. Gregory
*Assistant Examiner*—Eric Bolda
(74) *Attorney, Agent, or Firm*—McDermott Will & Emery LLP

(57) ABSTRACT

A Raman amplifier which can suppress the increase of MPI and enhances the amplification efficiency of signal light, and an optical transmission system using such amplifier are provided. The Raman amplifier comprises an optical fiber 10 having a reflection point at least at a first point 11 or second point 12, and a forward pumping source 21 and backward pumping source 22. In the pumping sources 21 and 22, the conditions for providing pumping light, such as whether to provide forward and backward pumping light and the power distribution between forward and backward pumping light, are designed in accordance with the location of the reflection point and reflection factor thereof in the optical fiber.

10 Claims, 10 Drawing Sheets

RAMAN AMPLIFIER, OPTICAL TRANSMISSION SYSTEM USING SUCH AMPLIFIER AND PUMPING LIGHT SOURCE THEREFOR

BACKGROUND OF THE INVENTION

1. Field of the Invention

The present invention relates to a Raman amplifier which has improved optical signal-to-noise ratio (OSNR) characteristics, an optical transmission system using such Raman amplifier and a pumping light source therefor.

2. Description of the Background Art

An optical fiber Raman amplifier amplifies signal light passing through an optical transmission line and compensates transmission loss caused in the transmission line. The Raman amplifier comprises an optical fiber for Raman amplification (hereinafter, Raman amplification optical fiber) that functions as an optical transmission line, and a pumping light source that provides pumping light to the Raman amplification optical fiber. When signal light is input to the optical amplifying fiber which is provided with the pumping light, such signal light is amplified in the fiber and then output.

For such optical amplifier, there have been used a rare-earth element doped fiber amplifier utilizing induced emission from a rare earth element such as erbium, and a Raman amplifier utilizing induced Raman scattering. For the Raman amplifier, a silica-based optical fiber constituting a transmission line between stations is used. In the Raman amplifier, by choosing a suitable wavelength band for the pumping light, any wavelength band can be designed to be a wavelength band for amplification.

As to the Raman amplifier, Multiple pass interference (MPI) that is caused by multiple scattering or multiple reflection has been a problem. The multiple scattering is caused by Rayleigh scattering that occurs in an optical amplifying fiber, and multiple reflection is caused by reflection which occurs at a reflection point such as a jointing part of a connector. Transmission characteristics of an optical transmission system including the Raman amplifier degrade with the increase in the ratio of MPI components to the signal light components to be amplified.

Japanese Patent Application Publication No. 2001-51309, corresponding to U.S. Pat. No. 6,366,729 B1, describes a Raman amplification system in which the line fiber comprises multiple sections and the nature and the length of fibers in each section are chosen so that the Raman gain coefficient is lower than the Rayleigh scattering at all points of the system. In such configuration, Rayleigh scattering that occurs during the amplification decreases, allowing a suppression of the increase of MPI components in the Raman amplifier. The above-mentioned specification describes an example in which an optical fiber having a large effective area is used as the fiber for Raman amplification on the side where pumping light is incident.

Here, Raman amplification gain G (on/off gain) is expressed by the following equation:

$$G = \exp\left(\frac{g_R P_P L_{eff}}{A_{eff}}\right),$$

where $g_R$ is Raman gain coefficient, $A_{eff}$ the effective area in the Raman amplification optical fiber, $P_P$ power of pumping light at the time of incidence into the Raman amplification optical fiber, and $L_{eff}$ the effective length of the Raman amplification optical fiber.

This equation shows that, when the power of pumping light $P_P$ is constant, Raman gain G decreases as the effective area $A_{eff}$ increases. Therefore, in the above-mentioned amplifier, while increase of MPI can be suppressed, sufficiently high amplification efficiency of signal light can not be attained.

SUMMARY OF THE INVENTION

The present invention provides a Raman amplifier that suppresses MPI and enhances amplification efficiency of signal light, and an optical transmission system using the same.

The Raman amplifier of this invention comprises (1) an amplifying optical fiber which is provided with a reflection point having a predetermined reflection factor and is capable of exhibiting a predetermined signal light output/input level, and through which signal light propagates while being Raman-amplified by pumping light, (2) a pumping light source for providing at least either forward or backward pumping light, and (3) a multiplexer for coupling signal light and pumping light, wherein the power of pumping light is designed such that the difference between the actual and maximum values in the effective OSNR of the Raman-amplifier is not more than 0.5 dB.

The reflection point is situated at least at one end of the amplifying optical fibers near the input port and output port of the Raman amplifier, and the pumping light source may provide a greater power of pumping light to the fiber end whose reflection factor is lower. In this case, the pumping light may be provided only to the point whose reflection factor is lower. Further, the pumping light source may provide the forward and backward pumping light at the power distribution ratio designed in accordance with the location of the reflection points and reflection factors thereof.

Relative Intensity Noise (RIN) may be not more than −120 dB/Hz or −130 dB/Hz. Further, on/off gain may be not less than 10 dB.

The optical amplifying fiber consists of a plurality of optical fibers connected together and having different Rayleigh scattering coefficients in the longitudinal direction, and the pumping light source may provide a greater power of pumping light to the end of a fiber having a smaller Rayleigh scattering coefficient among fiber ends near to the input port or output port of the Rayleigh amplifier. In this case, the pumping light source may provide the pumping light only to the fiber whose Rayleigh scattering coefficient is smaller.

Another aspect of the invention is to provide an optical transmission system. The system comprises an optical transmission line that transmits signal light within a predetermined wavelength band and such a Raman amplifier as described above that is located at a predetermined point of the optical transmission line. MPI crosstalk of the optical transmission system is preferably not more than −25 dB. Here, MPI crosstalk means the ratio of a power in multiple pass interference to that in the signal light.

Yet, another aspect of the invention is to provide a pumping light source that supplies forward and backward pumping light to the Raman amplification optical fiber. The pumping light source has a pumping light controller for controlling the power of the forward and backward pumping light so that the effective OSNR of the amplifier exhibits a difference of not more than 0.5 dB between the maximum and actual values thereof in accordance with the location of the reflection points and their reflection factors of the optical fiber.

The present invention is further explained below by referring to the accompanying drawings. The drawings are provided solely for the purpose of illustration and are not intended to limit the scope of the invention.

DETAILED DESCRIPTION OF THE INVENTION

Figure 1:
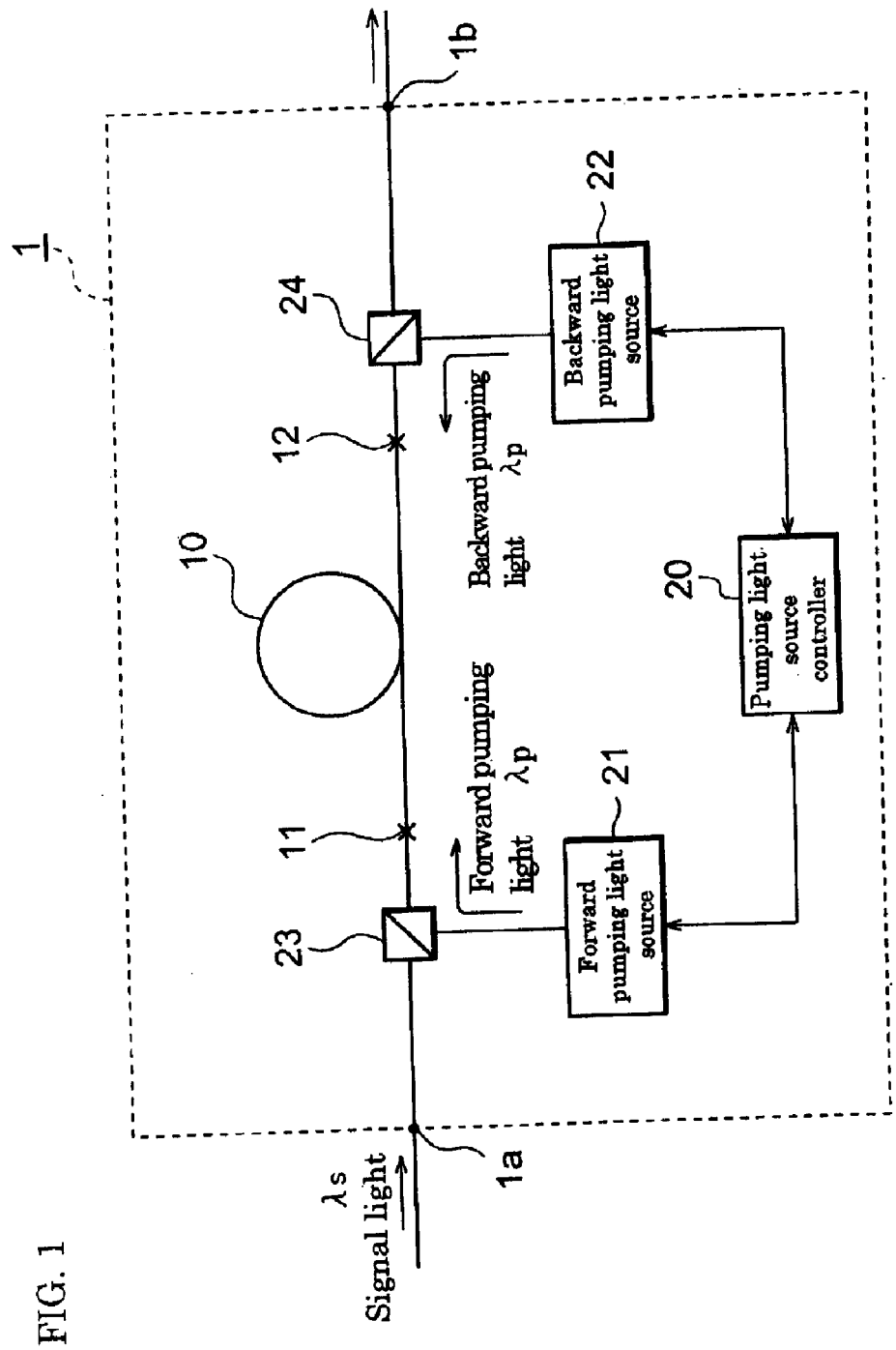
FIG. 1 is a block diagram showing one embodiment of a Raman amplifier.

Embodiments of the present invention are explained by referring to the accompanying drawings. In the drawings, the sane number refers to the same part to avoid duplicate explanation. The ratios of the dimensions in the drawings do not necessarily coincide with the explanation.

FIG. 1 is a block diagram showing one embodiment of a Raman amplifier according to the present invention. A Raman amplifier 1 amplifies signal light having wavelength $\lambda_S$ within a predetermined wavelength band by pumping light. The Raman amplifier 1 comprises an optical fiber 10 for amplification and two pumping light sources 21 and 22.

The optical fiber 10 is an optical transmission line through which the signal light to be amplified propagates from an input port 1a to an output port 1b, and which amplifies the signal light by means of pumping light having a predetermined wavelength $\lambda_P$. The fiber 10 has a reflection point at least either at a first point 11 on the side of the input port 1a or at a second point 12 on the side of the output port 1b. The reflection points are points coupled by connectors or mechanical splicing, for example.

The pumping light source provides forward pumping light from the first point 11 and backward pumping light from the second point 12 to the optical fiber 10. In the configuration as shown in FIG. 1, a light source 21 is a forward pumping light source which provides forward pumping light, and a light source 22 is a backward pumping light source which provides backward pumping light.

The forward pumping light source 21 is connected with the optical transmission line in the Raman amplifier 1 via an optical multiplexer 23 between the input port 1a and the first point 11. And the backward pumping light, source 22 is connected with the optical transmission line in the Raman amplifier 1 via an optical multiplexer 24 between the output port 1b and the second point 12. The optical multiplexers 23 and 24 are, for example, multiplexing filters or multiplexing couplers.

The optical multiplexer 23 transmits signal light, which has reached it from the input port 1a, to the optical fiber 10, and multiplexes the pumping light provided from the forward pumping light source 21 to the optical fiber 10 in the forward direction. The optical multiplexer 24 transmits signal light, which has reached it from the optical fiber 10, to the output port 1b, and multiplexes the pumping light provided from the backward pumping light source 22 to the optical fiber 10 in the backward direction. Thus, the Raman amplifier 1 is a bi-directional pumping optical amplifier.

Further, in the Raman amplifier 1 of this embodiment, the conditions for the forward pumping light and backward pumping light to be provided, particularly in terms of whether to provide such pumping light and power of the pumping light, are designed or controlled in accordance with the location of reflection points at the first and second points 11 and 12 and the reflection factor thereof.

Next, the effect of the Raman amplifier of this embodiment is described. In the amplification of signal light by a Raman amplifier, MPI, which occurs due to multi-reflection caused by a reflection of light at the reflection points of the Raman amplification optical fiber has been a problem. However, in the Raman amplifier 1 shown in FIG. 1, the conditions of the providing pumping light are designed considering the situation of the reflection points. Thus, as an increase of MPI can be suppressed as compared with the case where pumping light is provided without considering the situation of the reflection points, occurrence of MPI crosstalk in the amplifier can be reduced.

Further, giving attention to the reflection points of the optical fiber 10, the Raman amplifier can be designed so that the Raman amplification is sufficiently enhanced in terms of efficiency. Therefore, such a Raman amplifier can be obtained in which the increase of MPI is suppressed and MPI crosstalk decreased. In addition, the efficiency of amplification can be enhanced and improved OSNR characteristics can be achieved.

Here, as for the method of designing the conditions for providing the pumping light, the conditions of providing the pumping light in accordance with the reflection factor of the reflection points located at the first and second points 11 and 12 may be pre-determined with respect to the forward and backward pumping light sources 21 and 22. Alternatively, as shown in FIG. 1, the Raman amplifier may be designed such that a pumping light source controller 20 can control the forward pumping light source 21 and backward pumping light source 22 so that the conditions of providing pumping light are suitable for the reflection factor of the reflection points.

In the case of providing only one forward or backward pumping light, only the necessary pumping light source may be installed beforehand instead of controlling the conditions of providing pumping light in the structure shown in FIG. 1. Specific conditions for providing pumping light will be described later.

Figure 2:
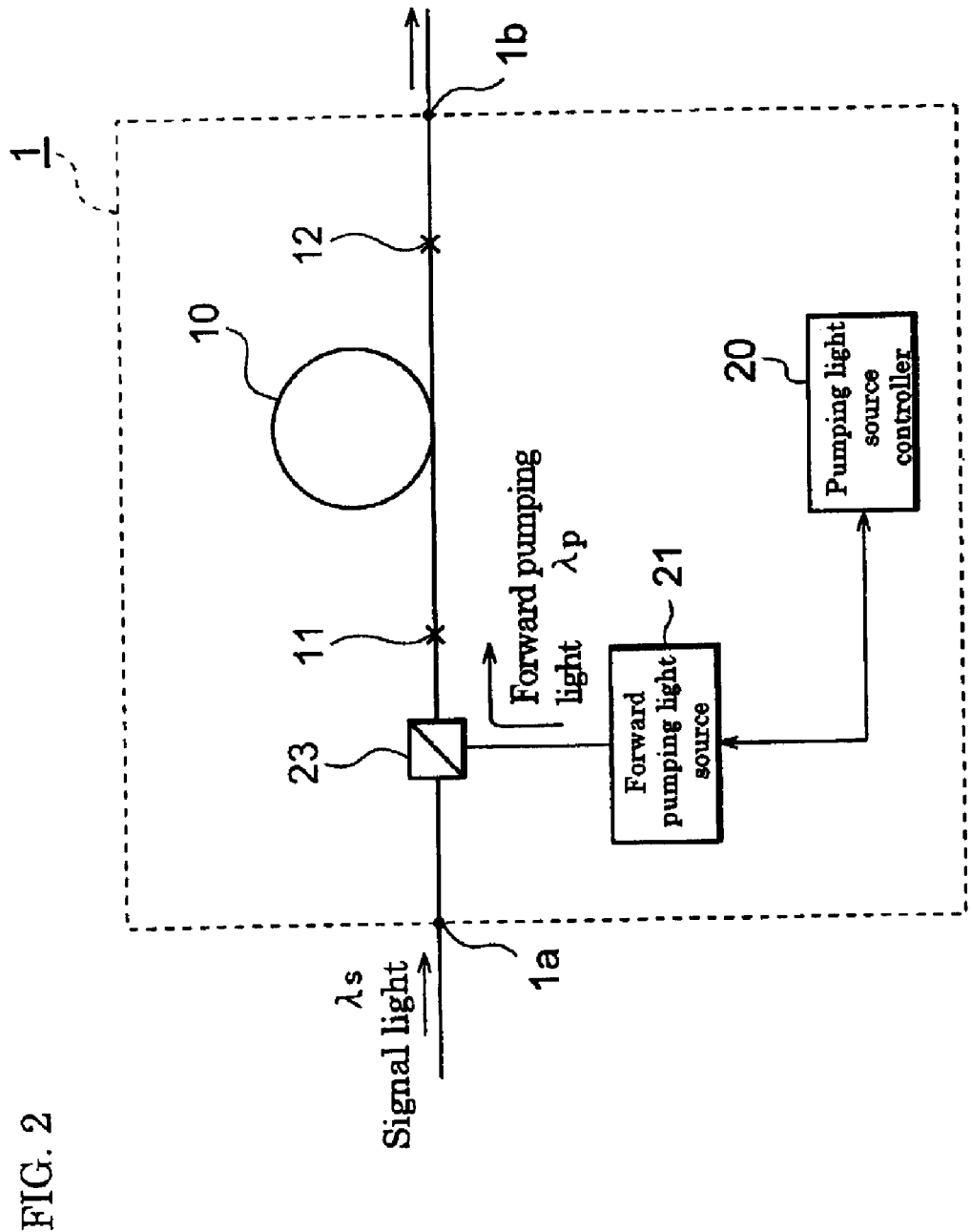
FIG. 2 is a block diagram showing another embodiment of a Raman amplifier.

FIG. 2 is a block diagram of another embodiment of the Raman amplifier. This embodiment shows the Raman amplifier 1 that is used when the conditions of providing only the forward pumping light are designed such that the backward pumping light source 22 and the optical multiplexer 24 in FIG. 1 are omitted. In contrast, when the conditions of providing only the backward pumping light are designed, it is possible to adopt a structure in which the forward pumping light source 21 and the optical multiplexer 23 shown in FIG. 1 are omitted.

In an article entitled "Rayleigh crosstalk in long cascades of distributed unsaturated Raman amplifiers," M. Nissov et al., Electronics Letters Vol. 35, No. 12 (1999) pp.997–998, it is described that Rayleigh crosstalk is minimized by bidirectional pumping at the power distribution ratio of 1:1. However, considering the reflection points located near the input or output port of the Raman amplifier, crosstalk is not always minimized at the power distribution ratio of 1:1 in bi-directional pumping. In contrast, in the above-mentioned Raman amplifier, the conditions, such as power of pumping light, for providing pumping light from the pumping light source are determined considering the situation of the reflection points of the optical fiber 10. This assuredly enables reduction in crosstalk occurrence in the Raman amplifier.

Figure 3:
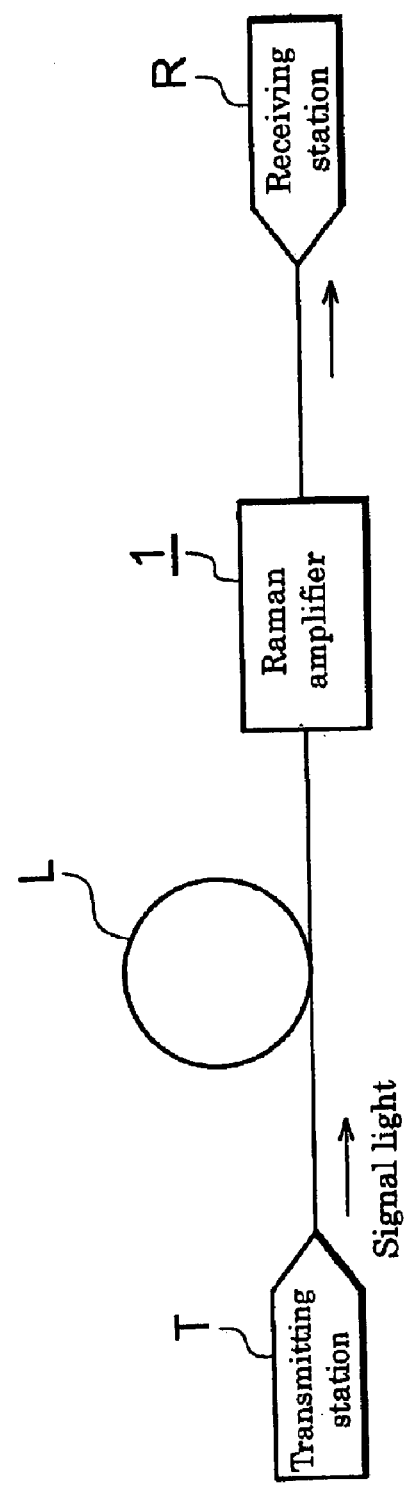
FIG. 3 is a diagram showing one embodiment of an optical transmission system.

Next, an optical transmission system using the above-mentioned Raman amplifier is described. FIG. 3 is one embodiment of an optical transmission system according to the invention. This optical transmission system comprises a transmitting station T having a transmitter which emits signal light at wavelength $\lambda_S$ within a predetermined wavelength band, an optical transmission line L through which optical signal light propagates, and a receiving station R having an optical receiver which receives the signal light. The Raman amplifier 1 shown in FIG. 1 is installed in a predetermined location of the optical transmission line L.

By using the Raman amplifier 1 having a structure as described above, an optical transmission system can be realized in which the increase of MPI can be suppressed, whereby MPI crosstalk is decreased, and enhanced amplification efficiency and improved OSNR characteristics are achieved.

Concerning the decrease of MPI crosstalk in the optical transmission system, MPI crosstalk is preferably not more than −25 dB. Transmission quality can be adequately maintained by designing MPI crosstalk to be not more than −25 dB considering power penalty in an optical transmission system.

Next, designing the conditions for providing pumping light in the Raman amplifier shown in FIG. 1 and the resultant decreasing effect of MPI crosstalk are described. Here, a Raman amplification optical fiber having reflection points such as connecting parts of connectors at the first point 11 and second point 12 was assumed as an amplifying optical fiber 10. A decreasing effect of MPI crosstalk was evaluated by running a simulation of characteristics of the Raman amplifier 1 in the case of using this optical fiber 10.

Figure 4:
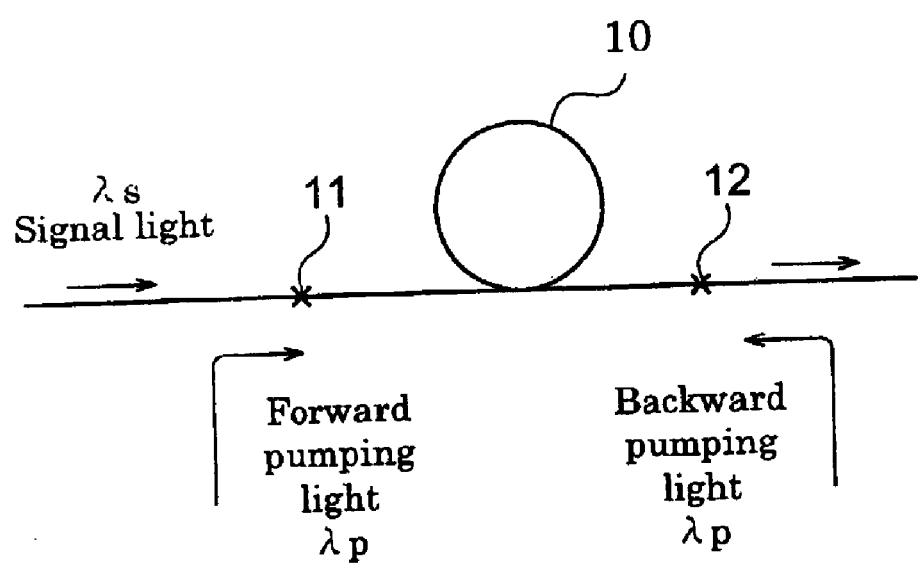
FIG. 4 is a diagram showing a simulation model for evaluating the features of the Raman amplifier shown in FIG. 1.

FIG. 4 is a diagram showing a simulation model for evaluating the characteristics of the Raman amplifier shown in FIG. 1. This simulation was performed on the assumption that an 80-km length of single mode fiber (SMF) was used as the optical fiber 10, and reflection factors of reflection points at the first point 11 and second point 12 were used as parameters of the simulation. The wavelength $\lambda_S$ of signal light transmitted through the SMF 10 was set at 1550 nm, and wavelength $\lambda_P$ of the forward pumping light and backward pumping light provided to the SMF 10 was set at 1450 nm. Raman amplification on/off gain to the signal light in the SMF 10 was set at 11.2 dB.

Figure 5:
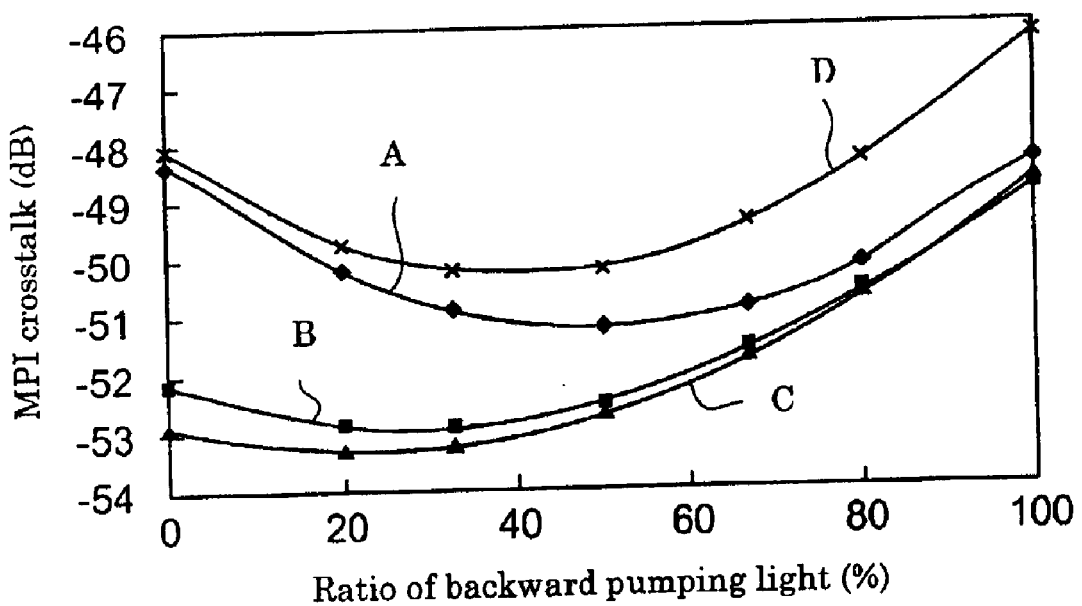
FIG. 5 is a graph showing the relationship between MPI crosstalk and the ratio of backward pumping light.

FIG. 5 is a graph showing the relation between the ratio of backward pumping light and MPI crosstalk. In this graph, the abscissa represents the ratio of power of the backward pumping light to the total power of the forward and backward pumping light. The ordinate represents MPI crosstalk that occurs during Raman amplification of the signal light in the SMF 10. Curves A to D show the relations when the reflection factors of the reflection points at the first point 11 and second point 12 were changed as set forth in Table I.

TABLE I

Figure 11:
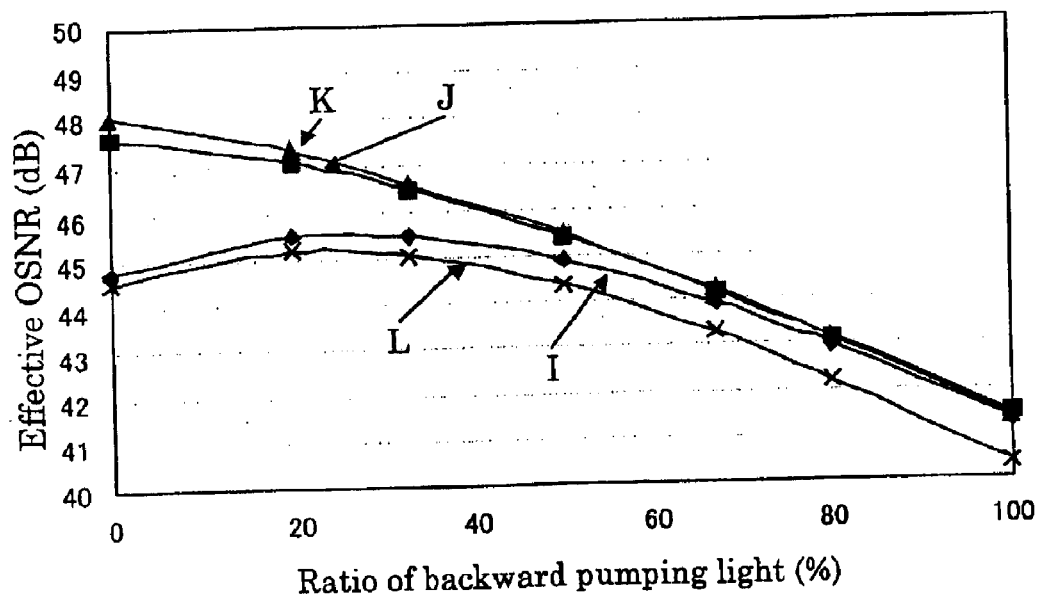
FIG. 11 is a graph showing the relationship between effective OSNRs and the ratio of backward pumping light.

| Curve | | Reflection factor dB | |
|---|---|---|---|
| FIG. 5 | FIG. 11 | Reflection point at first point 11 | Reflection point at second point 12 |
| A | I | −30 | −30 |
| B | J | −40 | −30 |
| C | K | −60 | −30 |
| D | L | −30 | −27 |

Among the curves, the curve A shows the relation between the ratio of the backward pumping light and MPI crosstalk when the reflection factors at the first and second points are equal. In this case, MPI crosstalk becomes minimum when the power distribution ratio of forward pumping light and that of backward pumping light is set at 50%, respectively.

On the other hand, the curves B, C and D show the relation between the backward pumping light and MPI crosstalk when the reflection factor at the first point is lower than that of the second point. In these cases, MPI crosstalk becomes minimum when the ratio of the forward pumping light entering the first point, whose reflection factor is lower, is set to be more than 50%. Although not shown in FIG. 5, in the case in which the reflection factor at the second point is lower than that at the first point, MPI crosstalk becomes minimum, when the ratio of the backward pumping light entering the second point, whose reflection factor is lower, is designed to be more than 50%.

FIG. 11 is a graph showing the relation between the ratio of backward pumping light and effective OSNR. In this graph, the abscissa shows the ratio of backward pumping light power to the total power of forward and backward pumping light. The ordinate shows the effective OSNR of signal light amplified in SMF 10, in the case where the signal transmission format is assumed to be a generally used 10 Gbps NRZ format.

The formula of effective OSNR ($OSNR_{eff}$) is as follows:

$$\frac{1}{OSNR_{eff}} = \frac{1}{OSNR_{ASE}} + \frac{\kappa}{OSNR_{MPI}}.$$

The effective OSNR was obtained by calculation in accordance with J. Bromage, et al, OFC 2002 Tech Dig., TuR 3. $\kappa$ is constant determined by bit rate and modulation type, and according to the above article, $\kappa=1.89$ in the case of 10 Gbps NRZ signal. As $\kappa$ changes depending on the base band of the signal, MPI's contribution changes, for example, if the bit rate and modulation type are changed. In general, $\kappa$ becomes smaller as the base band of the signal expands. The entire disclosure of the above article is incorporated herein in its entirety.

Curves I to L in the graph show the relation when the reflection factors at the reflection points located in the forward and second points 11 and 12 are changed as shown in Table 1. Among these curves, the curve I shows the relation between the ratio of backward pumping light and effective OSNR, when the reflection factors are equal at both points of SMF 10. In this case, the effective OSNR becomes maximum when the ratio of backward pumping light is about 30%, and the difference between the actual and maximum effective OSNR becomes not more than 0.5 dB when the above ratio falls within the range 10–50%. This is different from the case in which the pumping power ratio is 50%, because the effective OSNR is affected not only by MPI crosstalk, but also by amplified spontaneous emission (ASE).

In designing the conditions for providing the forward and backward pumping light, the power of pumping light to be supplied and whether to supply the respective pumping light to the first point 11 and second point 12 are determined considering the above mentioned relations and in accordance with the reflection factor of the reflection point at each point.

A first example of structure is such that the optical fiber 10 has reflection points at both the first point 11 and second point 12, and the point whose reflection factor at the reflection point is lower than the other point is selected, and accordingly the forward or backward pumping light is supplied only to the selected point. By choosing such a pumping method in terms of forward or backward pumping light in accordance with the reflection factors at reflection points, increase of MPI components in the Raman amplifier can be suppressed, thereby allowing MPI crosstalk to be decreased.

For example, in the case of the curve B, the amplifying structure is designed to allow pumping light to be supplied to the optical fiber 10 only from the first point whose reflection factor at the reflection point is lower than that of the second point. Such structure can be achieved by a design in which pumping light is supplied, out of pumping light sources 21 and 22 in the Raman amplifier 1 of FIG. 1, only from the forward pumping light source 21. Alternatively, only the forward pumping light source 21 may be installed as a pumping light source, as shown in FIG. 2.

A second example of amplifying structure is such that supply of pumping light to the optical fiber 10 having a reflection point at least at the first point 11 or second point 12 is done according to such ratio of power distribution to forward and backward pumping light as designed depending on the reflection factor at the respective reflection point. By adopting such a bi-directional pumping method, in which power distribution is designed according to the reflection factors at the reflection points, the increase of MPI components in the Raman amplifier can be suppressed, and hence MPI crosstalk decreased.

For example, in the case of the curve A, the amplifying structure is such that pumping light is supplied to the optical fiber 10 at 1:1 power distribution ratio of forward pumping light and backward pumping light as determined according to a mutually equal reflection factor of the reflection points at the forward and backward points. Also, in the case of the curve B, forward pumping light and backward pumping light are provided to the optical fiber 10 from the pumping light sources 21 and 22 respectively in a manner in which the ratio of the forward pumping light is designed to be greater than 50%, considering the fact that the reflection factor of the first point 11 is smaller than that of the second point 12. Such an amplifying constitution can be achieved, in the Raman amplifier 1 shown in FIG. 1, by designing the forward pumping light source 21 and backward pumping light source 22 respectively to provide predetermined power of pumping light.

Next, the Raman amplifier shown in FIG. 1 is studied with respect to Relative Intensity Noise (RIN). In the forward pumping type or bi-directional pumping type of the Raman amplifier, when RIN of the forward pumping light provided from the forward pumping light source is large, RIN of signal light is degraded thereby in some cases. Therefore, the forward pumping type or bi-directional pumping type of Raman amplifier is preferably designed so that the amount of improvement in RIN of signal light achieved by decreasing MPI crosstalk is greater than the amount of degradation caused to RIN of signal light by RIN of the pumping light.

Figure 6:
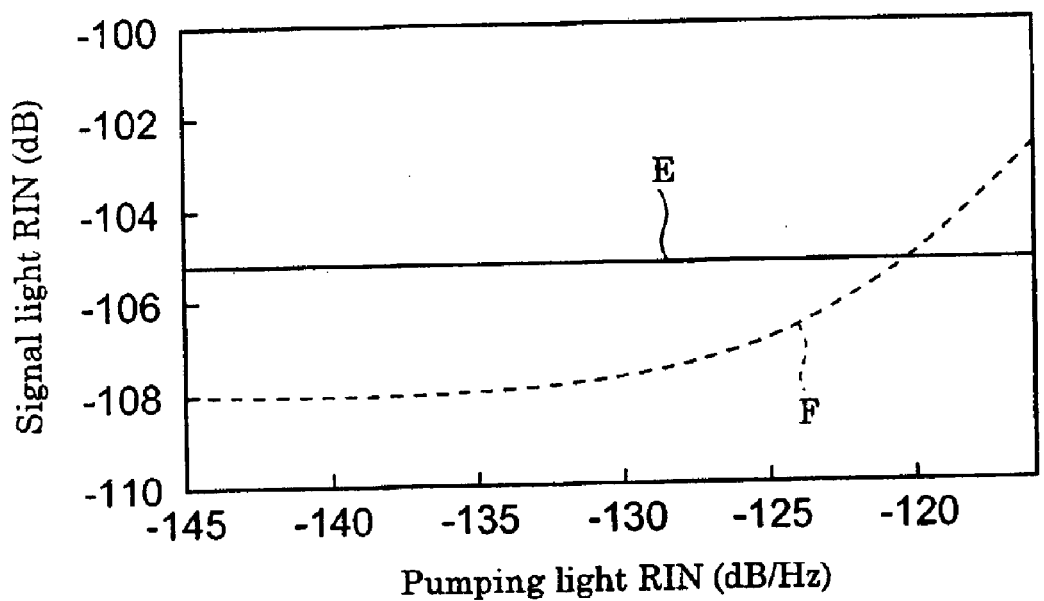
FIG. 6 is a graph showing the relation between RIN of pumping light and that of signal light.

FIG. 6 is a graph showing the relation between pumping light RIN and signal light RIN when the respective reflection factor at the first point 11 and second point 12 of the amplifying optical fiber 10 is −30 dB. In the graph, the abscissa shows RIN of pumping light supplied to the fiber 10. The ordinate shows signal light RIN obtained in the optical fiber 10. The curve E represents the relation in the case of the backward pumping, and MPI crosstalk here is −48.8 dB as shown by the curve A in FIG. 5. The curve F is the relation in the case of bi-directional pumping, when the ratio of forward and backward pumping is made 50%:50%, and MPI crosstalk then is −51.3 dB.

If the pumping light RIN is small, the signal light RIN in the bi-directional pumping is smaller than that of the backward pumping by about 3 dB, namely the difference of MPI crosstalk between both pumping types. While the signal light RIN in the backward pumping is constant, the signal light RIN increases in the bi-directional pumping. And, at the pumping light RIN of about −120 dB/Hz, the improvement of the signal light RIN by the decrease of MPI crosstalk is offset by the degradation of signal light RIN affected by the forward pumping light RIN. As a result, the signal light RIN in the bi-directional pumping becomes nearly equivalent to that in the backward pumping.

To adequately decrease the signal light RIN, as a whole, it is desirable that the constitution of the Raman amplifier 1 and conditions for supplying pumping light are determined considering the effect of the forward pumping light RIN on the signal light RIN. Further, RIN of forward pumping light provided from the forward pumping light source 21 is preferably designed not to be more than −120 dB/Hz in view of FIG. 6. In an amplifying structure for forward or bi-directional pumping, degradation of signal light RIN can be suppressed by designing the forward pumping light RIN not to be more than −120 dB/Hz. As for RIN of this forward pumping light, the more desirable value is not more than −130 dB.

Figure 7:
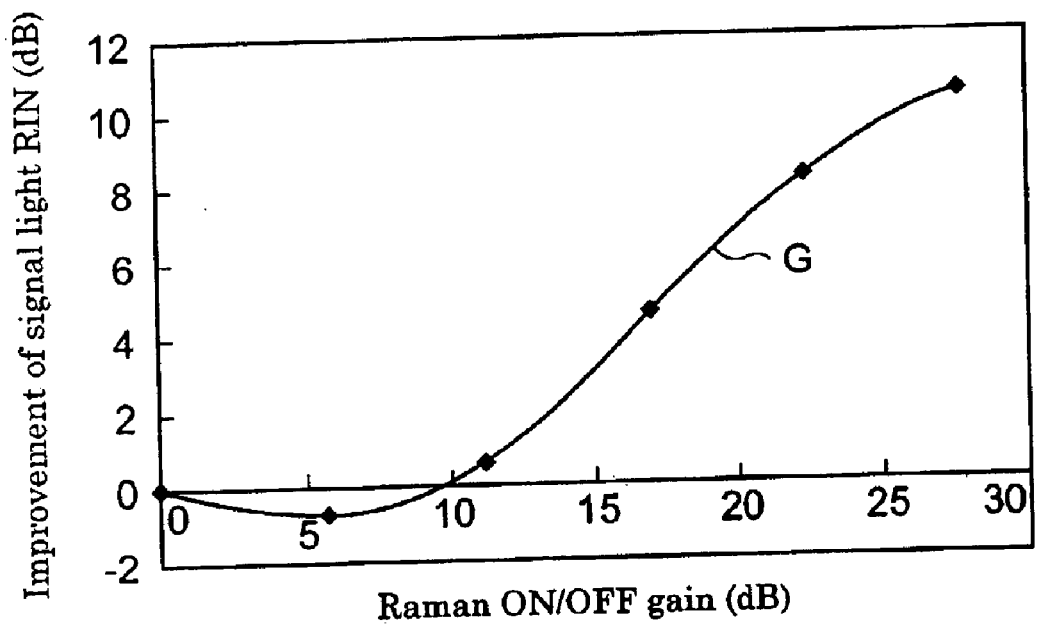
FIG. 7 is a graph showing the relation between the on/off gain and improvement of signal light RIN.

Next, Raman on/off gain of the Raman amplifier shown in FIG. 1 is studied. FIG. 7 is a graph showing the relation between Raman on/off gain and improvement of signal light RIN. The abscissa shows an on/off gain in the optical fiber 10 for Raman amplification. The ordinate shows improvement of signal tight RIN obtained in the optical fiber 10. The curve G shows signal light RIN obtained in 50%/50% bi-directional pumping on the basis of signal light RIN obtained in the backward pumping under the same conditions with respect to the position of the reflection points, reflection factor, and pumping light RIN, when the respective reflection factor at the first point 11 and second point 12 is −30 dB, and pumping light RIN is −120 dB/Hz.

In the curve G, under the condition that the on/off gain is small, the degradation of signal light RIN due to pumping light RIN is greater than the improvement of the signal light RIN due to the decrease of MPI crosstalk, and accordingly the signal light RIN is slightly degraded. On the other hand, as the on/off gain increases, improvement of the signal light RIN by decreasing MPI crosstalk becomes greater. In view of FIG. 7, it is desirable that the on/off gain of Raman amplification be made not less than 10 dB. Thus, the signal light RIN can effectively be improved by making the on/off gain a sufficiently large value.

Figure 8:
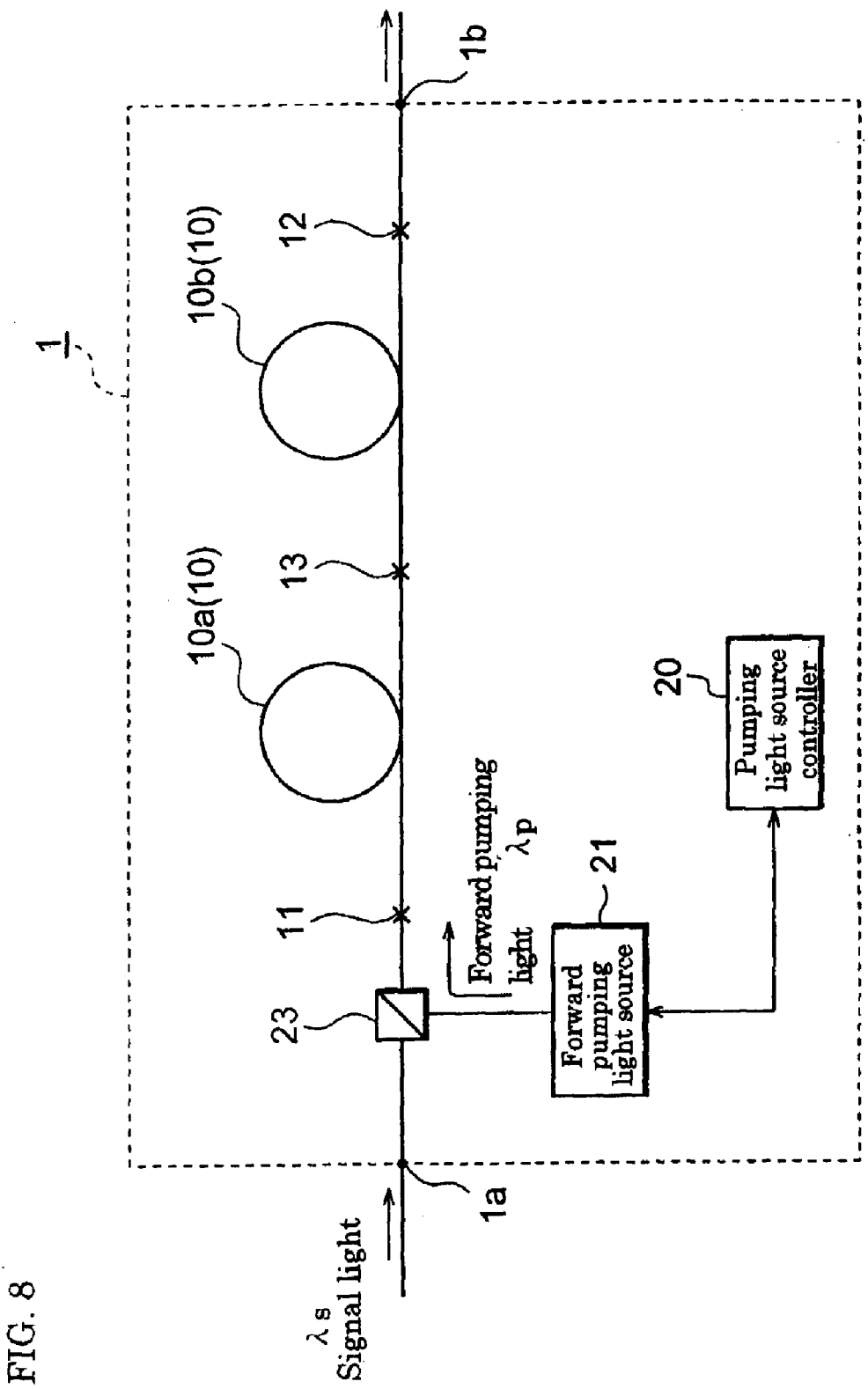
FIG. 8 is a block diagram showing yet another embodiment of a Raman amplifier.

The Raman amplifier according to the invention is further explained. FIG. 8 is a block diagram showing yet another embodiment of the Raman amplifier. In this embodiment, a Raman amplifier 1 comprises an optical fiber 10 consisting of two amplifying optical fibers 10a and 10b, a forward pumping light source 21, and an optical multiplexer 23.

Optical fibers 10a and 10b are connected in series in order of the 10a and 10b via a connecting point 13 from an input port 1a toward an output port 1b of a Raman amplifier. By this arrangement, while signal light propagates from the input port 1a to the output port 1b, the signal light can be amplified by pumping light in an optical fiber 10 for Raman amplification. In this embodiment, the Rayleigh scattering coefficient of the optical fiber 10a located on the first point side is smaller than that of the optical fiber 10b located on the second point side.

Further, the optical fiber 10a has a reflection point at a first point 11, which is an end located on the input port 1a side thereof, and the optical fiber 10b has a reflection point at a second point 12, which is located on the output port 1b side thereof, and these reflection points reflect a portion of light that propagates in a direction from inside to outside through the optical fibers 10a and 10b, respectively. Reflection factors at the reflection points of the first and second points 11 and 12 are nearly equal to each other.

A pumping light source 21 is installed to provide pumping light to the optical fibers 10a and 10b. The pumping light source 21 is a forward pumping light source that provides forward pumping light to the optical fibers 10a and 10b from the first point 11.

The forward pumping light source 21 is connected with the optical transmission line in the Raman amplifier 1 via an optical multiplexer 23 located between the input port 1a and the first point 11 of the optical fiber 10a. The optical multiplexer 23 transmits signal light entered from the input port 1a to the optical fibers 10a and 10b, and also multiplexes pumping light to the optical fibers 10a and 10b in the forward direction. Thus, this Raman amplifier is a forward pumping type.

In the Raman amplifier 1 shown in FIG. 8, the forward pumping light is supplied to the amplifying optical fibers 10a and 10b from the first point 11, at which located is an end of the optical fiber 10a whose Rayleigh scattering coefficient is smaller than that of the fiber 10b. As in this case, where plural amplifying optical fibers are connected in series, increase of MPI can be suppressed in the Raman amplifier by an arrangement such that the pumping light enters the optical fiber having a smaller Rayleigh scattering coefficient than the other.

Figure 9:
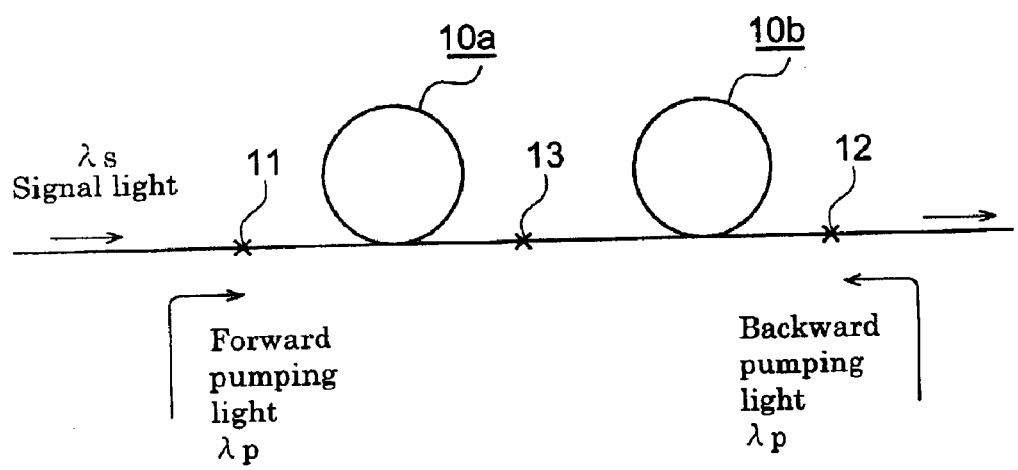
FIG. 9 is a diagram showing a simulation model concerning characteristics of the Raman amplifier shown in FIG. 8.

FIG. 9 is a diagram showing a simulation model for evaluating characteristics of the Raman amplifier shown in FIG. 8. This simulation was performed on the assumption that an 80-km length of SMF was used for the first point side optical fiber 10a, and a 20-km length of dispersion compensation fiber (DSF) was used for the second point side optical fiber 10b.

The wavelength of the signal light $\lambda_S$ was set at 1550 nm. The wavelength of forward and backward pumping light provided to SMF 10a and DCF 10b respectively was set as $\lambda_P$=1450 nm. The on/off gain of the Raman amplification to the signal light in SMF 10a and DCF 10b was assumed to be 11.2 dB.

Figure 10:
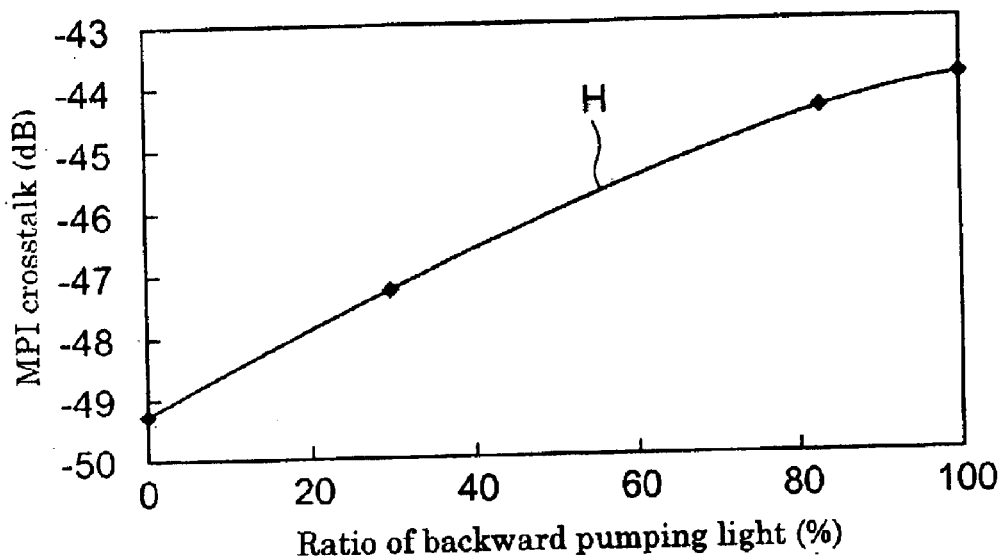
FIG. 10 is a graph showing the relation between backward pumping light and MPI crosstalk.

FIG. 10 is a graph showing the relation between the ratio of backward pumping light and MPI cross talk. In this graph, the abscissa shows the ratio of backward pumping light to the total pumping light of forward and backward pumping light. The ordinate shows MPI crosstalk representing the ratio of MPI components to signal light, where the MPI components are generated when the signal light is amplified in SMF 10a and DCF 10b. The curve H shows MPI crosstalk, when the Rayleigh scattering coefficient of the DCF 10b was designed to be 5 times that of the SMF 10a.

In the curve H, MPI crosstalk is minimum when the ratio of forward pumping light entering SMF 10a whose Rayleigh scattering coefficient being smaller was made 100%, and consequently that of backward pumping light was 0%. This clarifies that the increase of MPI components can be suppressed in the Raman amplifier by using an optical fiber with a smaller Rayleigh scattering coefficient as an amplifying optical fiber into which pumping light enters for Raman amplification.

The Raman amplifier and system according to the present invention are not limited to the above-mentioned embodiments. Various modifications and variations are possible. For example, concerning the signal light to be amplified in the Raman amplifier, not only a single wavelength signal light but also a multi-wavelength signal light may be amplified.

The entire disclosure of Japanese Patent Application No. 2002-060884 filed on Mar. 6th, 2002 including the specification, claims, drawings and summary are incorporated herein in its entirety.

What is claimed is:

1. A Raman amplifier comprising:
   an amplifying optical fiber provided with a reflection point having a predetermined reflection factor, and capable of exhibiting a predetermined input/output level of signal light, the signal light being Raman-amplified by pumping light while propagating through said fiber;
   a pumping light source for providing at least one of forward and backward pumping light; and
   an optical multiplexer for coupling said signal light and said pumping light,
   wherein power of said pumping light is designed such that difference between the maximum and actual values in the effective OSNR of said Raman amplifier is not more than 0.5 dB.

2. A Raman amplifier according to claim 1, wherein said reflection point is located at least at one point near ends of said amplifying optical fiber near an input port or output port of said Raman amplifier, and said pumping light source provides a greater power of pumping light to a fiber end whose reflection factor is smaller among ends of said amplifying optical fiber.

3. A Raman amplifier according to claim 1, wherein said pumping light source provides said forward and backward pumping light at the power distribution ratio determined in accordance with the location of said reflection point and reflection factor thereof.

4. A Raman amplifier according to claim 1, wherein relative intensity noise of said forward pumping light is not more than −120 dB/Hz.

5. A Raman amplifier according to claim 1, wherein relative intensity noise of said forward pumping light is not more than −130 dB/Hz.

6. A Raman amplifier according to claim 1, wherein Raman amplification on/off gain is not less than 10 dB.

7. A Raman amplifier according to claim 1, wherein
said amplifying optical fiber comprises plural optical fibers connected together and having different Rayleigh scattering coefficients in the longitudinal direction, and
said pumping light source provides a greater power of pumping light to the end of the fiber whose Rayleigh scattering coefficient is smaller among said optical fiber ends near the input or output port of said Raman amplifier.

8. An optical transmission system comprising:
an optical transmission line for transmitting signal light having a wavelength within a predetermined wavelength band, and
a Raman amplifier set forth in claim 1 and installed in a predetermined location.

9. An optical transmission system according to claim 8, wherein the ratio between the power of multi-reflection component and the power of signal light component is not more than −25 dB.

10. A pumping light source for providing forward pumping light and backward pumping light to an optical fiber that is part of a Raman amplifier, the pumping light source having a pumping light controller that can determine the power distribution ratio of said forward and backward pumping light in accordance with the location of reflection point and reflection factor of said optical fiber so that the difference between the maximum and actual values of the effective OSNR of said Raman amplifier is not more than 0.5 dB.

* * * * *